Dec. 31, 1940.  A. BOYNTON  2,226,547

SEMITHREADLESS DRILL STEM

Filed Sept. 22, 1938

ALEXANDER BOYNTON,
INVENTOR,
BY Jesse R. Stone
Lester B. Clark
ATTORNEYS.

Patented Dec. 31, 1940

2,226,547

UNITED STATES PATENT OFFICE 2,226,547

SEMITHREADLESS DRILL STEM

Alexander Boynton, San Antonio, Tex.

Application September 22, 1938, Serial No. 231,210

4 Claims. (Cl. 285—161)

My invention relates primarily to improvements in drill pipe for wells drilled by the rotary method and other pipe and, particularly, to means for connecting the joints thereof together.

The principal objects are: (1) To provide a means for connecting the joints together so that the drill stem can be rotated either clockwise or anti-clockwise without danger of the joints becoming disconnected, (2) to relieve the threads or circular keys, employed in place of threads, of torque caused by rotation of the drill pipe, (3) to eliminate the compression strain upon the male member and the expansion strain upon the female member of the connection while drilling, (4) to provide mechanism to take the rotation torque separate from the mechanism which holds the joints together, (5) to prevent the threads or keys, employed in place of threads, from galling, (6) to prevent leakage between the male and female member of the connection, and, (7) by the employment of small force in making and breaking the connections, to afford greater safety for drilling crews than can be provided by the preset threaded means for connecting drill pipe.

A socket wrench-line contact between the end of the drill pipe and the shell or coupling member permits rotation of the drill pipe in either direction, absorbs all the rotary torque, avoids the compression strain upon the pipe and the expansion strain upon the coupling, and imposes upon the threads or keys, employed in place of threads, the one duty only of holding the pipe together while it is being inserted into or being withdrawn from the well.

I attain the foregoing objects by mechanism illustrated in the accompanying drawing in which—

Similar characters of reference refer to similar parts throughout the several views of each embodiment.

Figure 1:
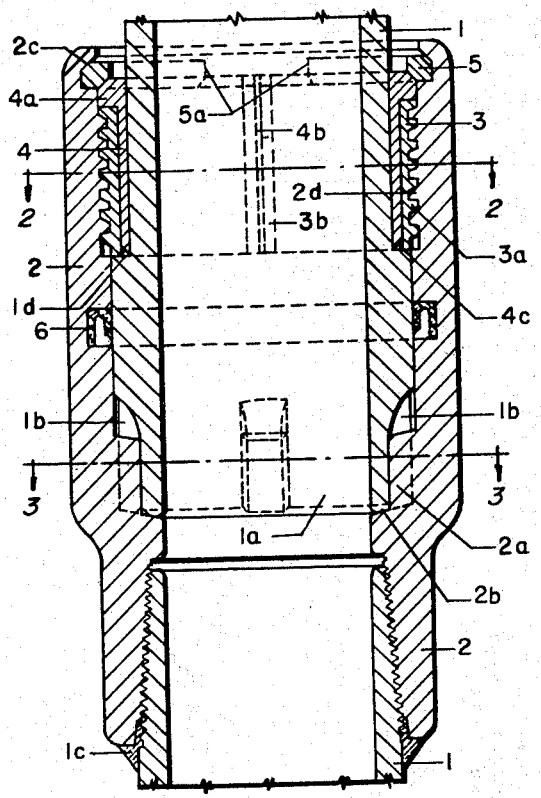
Fig. 1 is a longitudinal section thru the preferred embodiment of the invention.

In Fig. 1 the lower joint of drill pipe 1 has threaded engagement into the lower end of coupling-shell 2 upon which it may be further secured by weld 1c. The upper joint of drill pipe 1 is closely slidable within the coupling-shell 2 and has its lower end engageable upon the internal shoulder 2b. The lands 1a of the drill pipe enmesh with the lands 2a of the coupling-shell, as clearly appears in Fig. 3. The U-cup 6, which may be of leather or any other tough, expansible substance, is fitted within an internal recess within the coupling-shell 2 somewhat above the slots 1b of the drill pipe. This cup, which may be substituted by V-packing or the like, is adapted to be expanded by fluid pressure from below it. If any pump fluid should attempt to escape thru the slight annular clearance between the drill pipe and coupling-shell, this cup will seal off between the members 1 and 2; thereby providing a leak proof connection, as appears in Fig. 1.

To assemble the parts to form the connection, as shown in Fig. 1, the drill pipe 1 is seated upon the circular shoulder 2b. If, before so seating, the drill pipe should come to rest upon the lands 2a of the coupling-shell, slight rotation of the pipe will cause the lands 1a and 2a to enmesh. The two halves of the securing ring 3, having annular lands or projections 3a, adapted to engage between similar projections 2d within the coupling-shell, are then dropped into the annular space between members 1 and 2, landing upon the annular external shoulder 1d of the drill pipe. The two halves of the spreader ring 4, having their lower ends externally beveled at 4c, are then inserted between the halves of ring 3 and the drill pipe, forcing the two halves of ring 3 outward and causing its annular projections 3a to enmesh with the similar projections 2d within the coupling-shell 2. The ring shaped head 4a of ring halves 4 then engages upon the upper end of ring halves 3. The snap or lock ring 5 is then inserted, engaging between the head 4a and the internal bevel 2c of the coupling-shell. This completes the assembly. The openings 3b between the halves of ring 3, the openings 4b, between the halves of ring 4, and the opening 5a in the snap ring 5, are for the evident purpose of enabling the assembly of these parts to be made.

Figure 3:
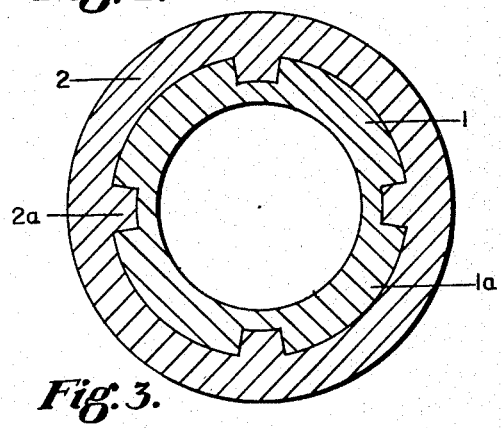
Fig. 3 is a cross section on the line 3—3, Fig. 1.

The enmeshed lands 1a and 2a of the drill pipe and coupling-shell, respectively, will not permit rotation of said members independent of each other (see Fig. 3). The enmeshed projections 3a and 2d secure the pipe and coupling-shell together against being pulled apart because the shoulder 1d is engaged under the ring 3 and the ring 4 is engaged under the snap ring 5. It, therefore, is apparent that the assembly shown in Fig. 1 may be rotated either clockwise or anti-clockwise without danger of the joint becoming disconnected and that the drill pipe will be pulled apart between the joints before it will be pulled out of the coupling-shell, provided, of course, that the enmeshed relation between the members 2 and 3 is made of proper length and that the projections 3a and 2d are of proper size. For 4½" drill pipe, for example, a satisfactory connection can be made by providing a length of three inches for the member 3 and making the enmeshed projections 3a and 2d ⅛" by ⅛".

The snap ring 5 may be quickly and easily removed by compressing it to partially close the opening 5a between its ends; whereupon the ring 4 may be lifted out and the ring 3 moved inward against the drill pipe and also lifted out. The drill pipe may then be removed from the coupling-shell, as is plain to be seen in Fig. 1.

Figure 4:
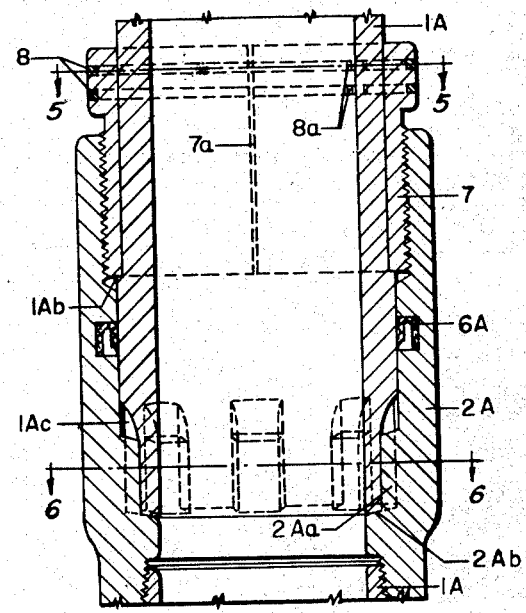
Fig. 4 is a longitudinal section thru a modified form of this invention.
Figure 2:
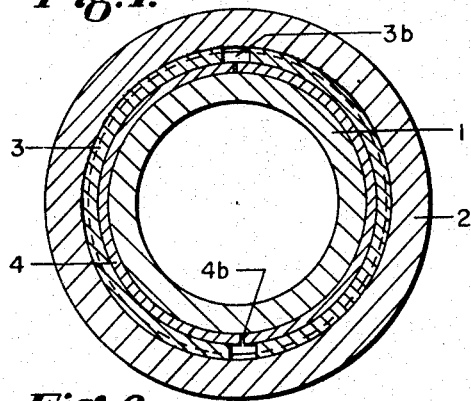
Fig. 2 is a cross section on the line 2—2, Fig. 1.
Figure 5:
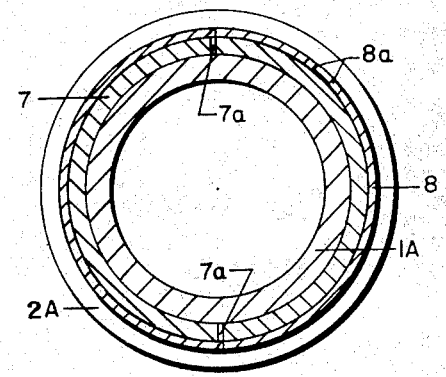
Fig. 5 is a cross section on the line 5—5, Fig. 4.
Figure 6:
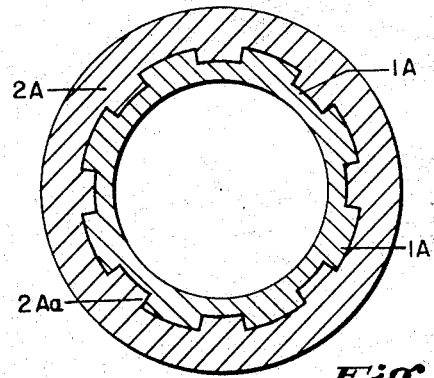
Fig. 6 is a cross section on the line 6—6, Fig. 4.

Figs. 4, 5, and 6 illustrate the modified form of this invention.

In Fig. 4 the lower joint of drill pipe 1A may be threadedly joined and welded to the coupling-shell 2A, as in Fig. 1. The upper joint of drill pipe 1A is closely slidable within the coupling-shell 2A and has its lower end landed upon the internal circular shoulder 2Ab while its lands 1Aa are enmeshed with the lands 2Aa of the member 2, as appears in Fig. 6. The U-cut 6A, positioned in a recess within the coupling-shell slightly above the cut 1Ac, prevents leakage of pump fluid between the members 1A and 2A, as was stated for the similar cup 6 in connection with Fig. 1.

To form the connection, as in Fig. 4, the drill pipe is landed upon the internal shoulder 2Ab and the assembling nipple 7, split in two halves, as shown at opening 7a, conforming to the drill pipe and having threaded connection within the upper end of the coupling-shell 2A, is screwed down firmly upon the external shoulder 1Ab of the drill pipe. The square spring wires 8, having their ends slightly apart at 8a, are formed to the circle of the grooves in nipple 7 into which grooves they are fitted, hold together the halves of nipple 7 so that it will remain upon the drill pipe when the latter is withdrawn from the coupling-shell and so that the threads will remain in line for quick and convenient engagement with their mating threads when the connection is to be remade.

All pulling part strain upon the drill pipe is borne upon the shoulder 1Ab engaging with the lower end of split nipple 7, as is apparent. The threads will not gall because the rotary thrust of the drill stem is borne by the enmeshed lands 1Aa and 2Aa which permit the drill stem to be rotated in either direction without danger of becoming thereby disconnected. For the same reason the threads will not be screwed together more tightly when the drill stem is rotated in drilling. Thus is eliminated the great force and resulting danger of making up and breaking out drill pipe connected by threads which must be made up tightly to support the weight of the drill stem while it is being inserted into the well and which make up much tighter during the operation of drilling.

Preferably, a connection such as shown in Fig. 1 or 4 should be employed to form all connections in the drill stem, thus avoiding the use of tool joints and accomplishing all of the stated objects.

Obviously, either form of this invention can be employed for pipe unions or means for connecting shafts together, and other similar or related purposes. Where the word "pipe" is employed in the claims herein, it is therefore intended that shafts, rods, staffs and the like are included. Where the construction shown in Fig. 1 is employed for pipe unions, the enmeshed land 1a and 2a of the pipe and coupling-shell, respectively, may be omitted and packing may be placed under the split ring 4, the bevel 4c serving to compress the packing. Where the construction shown in Fig. 4 is employed for unions the enmeshed lands 1Aa of the pipe and 2Aa of the coupling-shell may be omitted. Packing may also be placed under the lower end of ring 7.

It is apparent that many minor changes in construction and substitution of parts may be made within the scope and purpose of the objects stated and claims appended, and I reserve the right to make such changes and substitutions.

I claim:

1. A pipe connection including non-rotatably interfitting pipe ends, a shoulder outstanding on the periphery of the internal pipe end, and means fitted into the external pipe end after interfitting of the pipe ends to engage said shoulder and hold said ends against axial movement, said means including a split ring, movable radially outward to fit said external end, a spreader ring to hold said split ring, and a snap ring to lock said spreader ring.

2. A pipe connection including non-rotatably interfitting pipe ends, a shoulder outstanding on the periphery of the internal pipe end, and means fitted into the external pipe end after interfitting of the pipe ends to engage said shoulder and hold said ends against axial movement, said means including a split ring threaded into said external ring, and a lock ring therefor.

3. A drill pipe connection including a pipe section, a shell member fixed thereto, a pipe end non-rotatably interfitting said shell, a shoulder on said end, a shoulder in said shell, a grooved area above said shell shoulder, a retainer ring to drop into said shell to seat on said shoulders, ribs on the periphery of said retainer ring to fit said grooves, a spreader ring to fit inside of said retainer ring and move said ribs into said grooves, and a snap ring to lock said spreader ring in said shell.

4. In a pipe connection, a pipe slidably received within a coupling shell and having its end landed upon a circular shoulder therein, said shell and the end of said pipe being interfittingly locked together by enmeshed lands; an annular recess around said pipe forming a shoulder thereon within said shell, a second recess within said shell, said last recess being opposite the first and having annular projections, a transversely segmented ring in said second recess, said ring having peripheral annular projections adapted to enmesh with said first projections, a segmented expander ring adapted to force said projections into enmeshed relation, said last ring having an enlarged end forming an annular external flange overlapping said first segmented ring, a third recess within said shell proximate said second recess, a snap ring in said third recess, said snap ring engaging said enlarged end to prevent longitudinal movement between said pipe and shell, and means for preventing leakage between said last members.

ALEXANDER BOYNTON.